(12) United States Patent
Ookawa et al.

(10) Patent No.: US 8,134,495 B2
(45) Date of Patent: Mar. 13, 2012

(54) TRANSMITTER APPARATUS FOR TRANSMITTING RF PULSE SIGNAL, TRANSMITTER/RECEIVER APPARATUS INCORPORATING THE TRANSMITTER APPARATUS, AND RECEIVER APPARATUS FOR RECEIVING RF PULSE SIGNAL

(75) Inventors: Kunihiko Ookawa, Nisshin (JP); Yasuyuki Miyake, Toyota (JP)

(73) Assignee: Denso Corporation, Kariya (JP)

( * ) Notice: Subject to any disclaimer, the term of this patent is extended or adjusted under 35 U.S.C. 154(b) by 249 days.

(21) Appl. No.: 12/658,969

(22) Filed: Feb. 18, 2010

(65) Prior Publication Data
US 2010/0214159 A1 Aug. 26, 2010

(30) Foreign Application Priority Data

Feb. 25, 2009 (JP) ................................. 2009-042859

(51) Int. Cl.
*G01S 13/00* (2006.01)
(52) U.S. Cl. ......... 342/202; 342/159; 342/175; 342/203
(58) Field of Classification Search .............. 342/70–72, 342/159, 175, 202, 203
See application file for complete search history.

(56) References Cited

U.S. PATENT DOCUMENTS

| | | | | |
|---|---|---|---|---|
| 3,256,520 A | * | 6/1966 | Blitz | 342/128 |
| 3,727,220 A | * | 4/1973 | Brennan et al. | 342/89 |
| 3,952,302 A | * | 4/1976 | Mullins | 342/161 |
| 5,134,411 A | * | 7/1992 | Adler | 342/130 |
| 5,581,495 A | * | 12/1996 | Adkins et al. | 708/319 |
| 5,657,021 A | * | 8/1997 | Ehsani-Nategh et al. | 342/70 |
| 5,731,781 A | * | 3/1998 | Reed | 342/135 |
| 5,872,540 A | * | 2/1999 | Casabona et al. | 342/362 |
| 5,969,667 A | * | 10/1999 | Farmer et al. | 342/165 |
| 6,657,583 B2 | * | 12/2003 | Okamura | 342/135 |
| 6,664,920 B1 | * | 12/2003 | Mott et al. | 342/129 |
| 6,707,419 B2 | * | 3/2004 | Woodington et al. | 342/200 |
| 6,798,375 B2 | * | 9/2004 | Brosche | 342/159 |
| 6,801,153 B2 | * | 10/2004 | Rauch et al. | 342/21 |
| 6,873,250 B2 | * | 3/2005 | Viana et al. | 340/435 |
| 6,903,678 B2 | * | 6/2005 | Kumon et al. | 342/70 |

(Continued)

FOREIGN PATENT DOCUMENTS

JP 2006-197242 7/2006

(Continued)

OTHER PUBLICATIONS

Office Action dated Dec. 7, 2010, in corresponding Japanese Application No. 2009-042859, and English translation thereof.

*Primary Examiner* — Thomas Tarcza
*Assistant Examiner* — Peter Bythrow
(74) *Attorney, Agent, or Firm* — Harness, Dickey & Pierce, PLC

(57) ABSTRACT

A transmitter apparatus generates a RF pulse signal having alternating high-amplitude pulse-on intervals and low-amplitude pulse-off intervals, and supplies the RF pulse signal as respective individual transmission signals of antenna elements of an array antenna, with the individual transmission signals having a phase distribution during each pulse-on interval whereby a beam is transmitted from the antenna in a predetermined transmission direction. During each pulse-off interval, a different phase distribution is established for the individual transmission signals, thereby reducing the level of noise radiated in the transmission direction during each pulse-off interval.

6 Claims, 11 Drawing Sheets

U.S. PATENT DOCUMENTS

| | | | |
|---|---|---|---|
| 6,903,679 B2 * | 6/2005 | Hanson et al. | 342/91 |
| 6,917,327 B2 * | 7/2005 | Jenkins | 342/202 |
| 6,977,609 B2 * | 12/2005 | Pleva et al. | 342/28 |
| 7,071,868 B2 * | 7/2006 | Woodington et al. | 342/70 |
| 7,161,526 B2 * | 1/2007 | Cornic et al. | 342/27 |
| 7,202,812 B2 * | 4/2007 | Krikorian et al. | 342/198 |
| 7,286,080 B2 * | 10/2007 | Sakamoto et al. | 342/175 |
| 7,579,982 B2 * | 8/2009 | Matsuoka | 342/196 |
| 7,602,333 B2 * | 10/2009 | Hiramatsu et al. | 342/175 |
| 7,773,028 B2 * | 8/2010 | Chan et al. | 342/137 |
| 7,812,760 B2 * | 10/2010 | Teshirogi et al. | 342/135 |
| 7,839,321 B2 * | 11/2010 | Huang et al. | 342/29 |
| 2006/0273952 A1 * | 12/2006 | Krikorian et al. | 342/198 |
| 2007/0085727 A1 * | 4/2007 | Backes et al. | 342/68 |
| 2008/0303711 A1 * | 12/2008 | Matsuoka | 342/196 |
| 2009/0232260 A1 * | 9/2009 | Hayashi et al. | 375/346 |

FOREIGN PATENT DOCUMENTS

| | | |
|---|---|---|
| JP | 2007-028089 | 2/2007 |
| JP | 2008-053837 | 3/2008 |
| JP | 2008-304417 | 12/2008 |
| WO | WO 2006/059367 | 6/2006 |

* cited by examiner

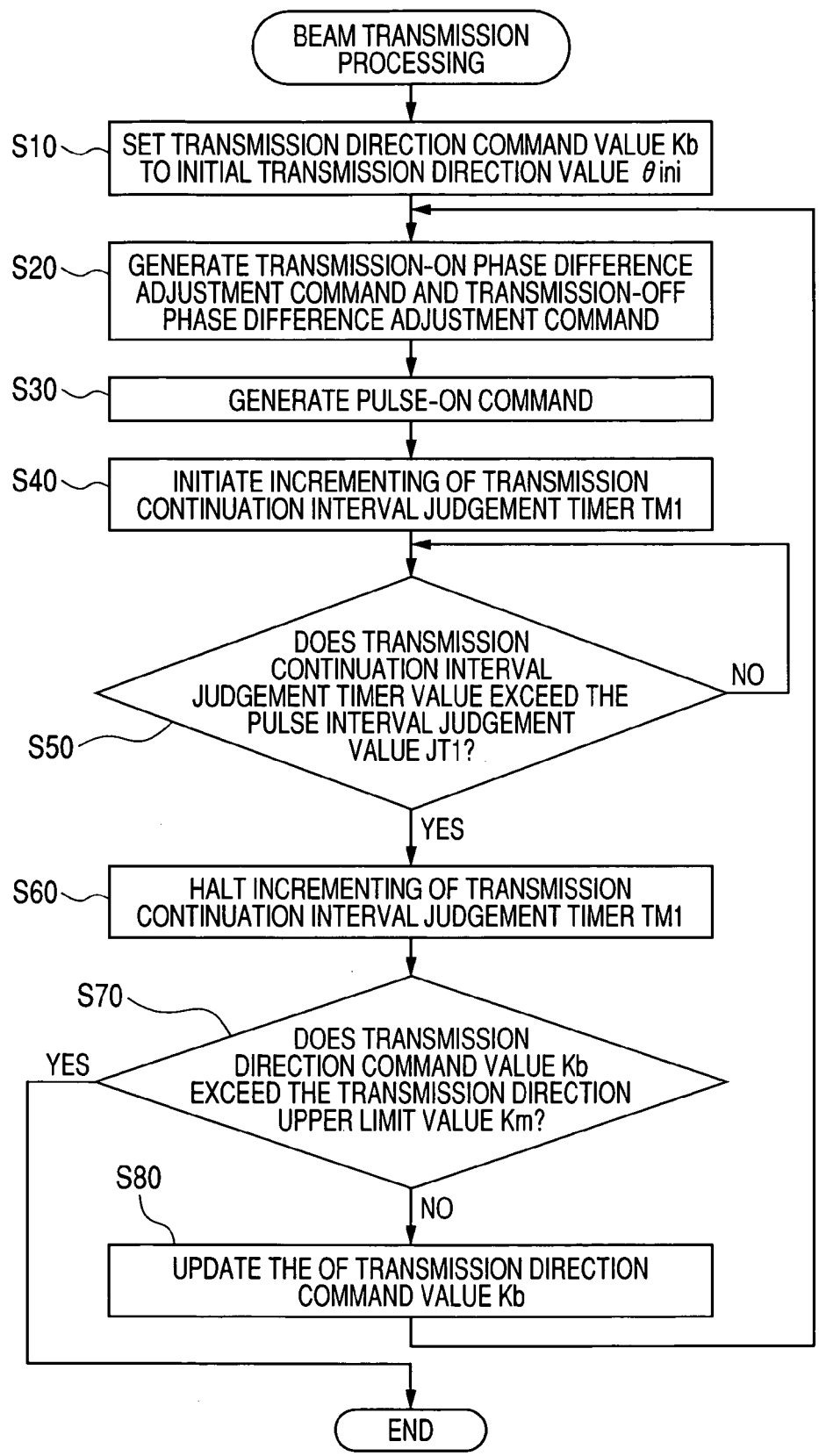

TRANSMITTER APPARATUS FOR TRANSMITTING RF PULSE SIGNAL, TRANSMITTER/RECEIVER APPARATUS INCORPORATING THE TRANSMITTER APPARATUS, AND RECEIVER APPARATUS FOR RECEIVING RF PULSE SIGNAL

CROSS-REFERENCE TO RELATED APPLICATIONS

This application is based on and incorporates herein by reference Japanese Patent Application No. 2009-042859 filed on Feb. 25, 2009.

BACKGROUND OF THE INVENTION

1. Field of the Invention

The present invention relates to a transmitter apparatus for transmitting a RF (radio frequency) pulse signal, a transmitter/receiver apparatus incorporating the transmitter apparatus, and a receiver apparatus for receiving signals that have been transmitted by a RF pulse signal transmitter apparatus.

2. Description of Related Technology

Types of transmitter apparatus are known (e.g., for radar applications) which incorporate an array antenna having a plurality of antenna elements, wherein an RF pulse signal is supplied as respective individual transmission signals to the antenna elements, with the phase distribution (combination of phases) of the individual transmission signals being predetermined for transmitting the RF pulse signal as a beam of modulated electromagnetic waves in a specific direction. The term "RF pulse signal" as used herein signifies a signal (as illustrated by the waveform diagram of FIG. 12), generated by a known type of pulse modulator circuit. The signal consists of intervals (Pon) of high-amplitude RF signal (referred to herein as the "pulse-on" condition) separated by intervals (Poff) of low-amplitude RF signal (referred to herein as the "pulse-off" condition).

With a practical type of pulse modulator circuit for generating such a signal at high RF frequencies, it is not possible to completely exclude a RF signal component during the pulse-off condition. The low-amplitude RF signal in the pulse-off condition is referred to in the following as the leakage signal component.

It is desirable that the amplitude ratio of the pulse-on to pulse-off portions (i.e., ratio of amplitude in pulse-on condition to the leakage signal amplitude) should be sufficiently high. However that has been difficult to achieve hitherto. To try to reduce the relative amplitude of the leakage signal component it has been proposed (for example in International patent publication No. 2006/059367) to incorporate a switch, which will be controlled to pass each pulse-on portion of the RF pulse signal and to block each pulse-off portion. It is further proposed to incorporate an amplifier for amplifying the RF pulse signal only during each of the pulse-on intervals.

However such methods of improving the transmitting/receiving performance by reducing the relative amplitude of the leakage signal component have the disadvantage of requiring expensive additional devices such as switches and amplifiers.

SUMMARY OF THE INVENTION

It is an objective of the present invention to overcome the above problem, achieving a reduction of adverse effects of the leakage signal component of a RF pulse signal, without requiring the use of additional switches or amplifiers to achieve the objective.

To achieve the objective, according to a first aspect, the invention provides, a RF pulse signal transmitter apparatus having a transmitting antenna formed of an array of antenna elements arranged with a fixed pitch, and RF pulse signal supplying circuitry which supplies the RF pulse signal (as a plurality of individual transmission signals corresponding to respective antenna elements) to be transmitted (as electromagnetic waves) by the antenna. As described above, the RF pulse signal is a high-frequency signal which alternates between intervals of a high-amplitude condition referred to as the pulse-on condition and intervals of a low-amplitude condition referred to as the pulse-off condition (intervals containing a leakage signal component). "High-frequency" here signifies for example a frequency in the microwave range.

The apparatus further includes phase adjustment circuitry which is controlled to adjust the phase distribution of the individual transmission signals. The apparatus also includes direction control circuitry which controls the phase adjustment circuitry for setting the phase distribution during a pulse-on interval such that the RF pulse signal is transmitted (i.e., as modulated electromagnetic waves) from the array antenna in a predetermined transmission direction.

The apparatus is characterized in further comprising phase alteration circuitry, which controls the phase adjustment circuitry such as to establish a phase distribution of the individual transmission signals, during the pulse-off condition, which is different from the phase distribution during each interval of the pulse-on condition.

More specifically, depending upon the application of the transmitter apparatus, the phase distribution of the individual transmission signals may be left unchanged during each of a plurality of successive pulse-on intervals, or may sequentially vary in successive pulse-on intervals (i.e., for establishing successively different transmission directions). However in either case, the present invention can ensure that electromagnetic waves resulting from the leakage signal component of the RF pulse signal will not be radiated with maximum intensity in a direction that is identical to a transmission direction (transmitted beam direction) that is established during pulse-on intervals of the RF pulse signal.

In that way, it is ensured that the level of radiated power from the antenna in a transmission direction during each pulse-off interval (i.e., transmitted noise which results from the leakage signal component of the RF pulse signal) is substantially reduced, by comparison with the case in which the phase distribution is left unchanged from the phase distribution(s) during pulse-on intervals.

Thus improved performance can be achieved, with a reduction of the level of noise that is transmitted from the antenna due to the leakage signal component of the RF pulse signal during each pulse-off interval (i.e., noise that is transmitted as electromagnetic waves in the same direction as a beam which is transmitted during a pulse-on interval).

From another aspect, the invention provides a transmitter/receiver apparatus incorporating a transmitter apparatus as described above, in which the array antenna functions in common as a transmitting antenna and as a receiving antenna. When the RF pulse signal transmitted from the antenna is received back at the antenna (i.e., as electromagnetic waves which have been reflected back from some object), it is received as a plurality of individual received signals from respectively corresponding ones of the antenna elements, during each interval of pulse-off condition of the transmitted RF pulse signal.

The transmitter/receiver apparatus comprises a plurality of circulators (i.e., microwave circulators). Each circulator transfers a corresponding individual transmission signal to a corresponding antenna element, and also transfers a corresponding individual received signal from a corresponding antenna element, while isolating the individual transmission signal and individual received signal from one another. The individual received signals are transferred from the circulators to receiver circuitry of the transmitter/receiver apparatus, and combined into a single received signal.

In the prior art, with such a type of transmitter/receiver apparatus, the leakage signal component of the transmitted RF pulse signal (occurring during each pulse-off interval of that signal) causes interference with the individual received signals, by interacting with these signals within the respective circulators. This interference is especially strong when the received signal and transmitted signal are of identical phase. However when a transmitter apparatus according to the present invention is applied in such a transmitter/receiver apparatus, the phase distribution of the individual transmission signals during each pulse-off interval (i.e., phase distribution of the respective leakage signal components of these individual transmission signals) is made different from the phase distribution(s) in the pulse-on intervals, as described above.

As a result, interference occurring within the circulators due to the leakage signal component of the transmitted RF pulse signal can be effectively reduced. This advantage is obtained in addition to the above-described basic advantage of a transmitter apparatus according to the present invention, i.e., a lowering of the level of noise power that is radiated in a transmitted beam direction during each pulse-off interval.

From another aspect, the invention provides a transmitter/receiver apparatus incorporating a transmitter apparatus as described above, having a second array antenna formed of a second array of antenna elements disposed with a fixed pitch. The transmitter/receiver apparatus further includes receiver circuitry which receives a plurality of individual received signals, supplied from respectively corresponding ones of the antenna elements of the second array antenna, and reception-side phase adjustment circuitry which is controlled to adjust the phase distribution of the individual received signals. The transmitter/receiver apparatus also includes reception direction control circuitry, for selecting a gate interval. This is an interval of approximately the same duration as a pulse-on interval of the transmitted RF pulse signal, which begins after a predetermined time has elapsed following a pulse-on interval. The reception direction control circuitry also controls the reception-side phase adjustment circuitry for establishing a first phase distribution of the individual reception signals during the gate interval, with the first phase distribution being predetermined for maximizing the reception sensitivity with respect to a received signal corresponding to the transmission direction.

More specifically, during a gate interval, the first phase distribution is determined such as to maximize the reception sensitivity with respect to a received signal which results from received electromagnetic waves that arrive along a specific direction, i.e., the direction of the transmitted beam during the preceding pulse-on interval.

The transmitter/receiver apparatus further includes gate interval scanning circuitry for scanning the timing of the gate interval within the interval between successive pulse-on intervals of the transmitted RF pulse signal.

Such a transmitter/receiver apparatus is characterized by incorporating reception-side phase alteration circuitry, which controls the reception-side phase adjustment circuitry to establish a second phase distribution of the individual reception signals, with the second phase distribution being different from the first phase distribution. This second phase distribution is established continuously, other than during each interval (i.e., gate interval) when the reception direction control circuitry is applying control to establish the first phase distribution.

In that way, the reception sensitivity is optimized only during each range gate interval, so that resistance to noise conveyed by the received signals can be effectively increased.

BRIEF DESCRIPTION OF THE DRAWINGS

FIG. 2 is a flow diagram of beam transmission processing executed by the first embodiment;

DESCRIPTION OF PREFERRED EMBODIMENTS

First Embodiment

Figure 1:
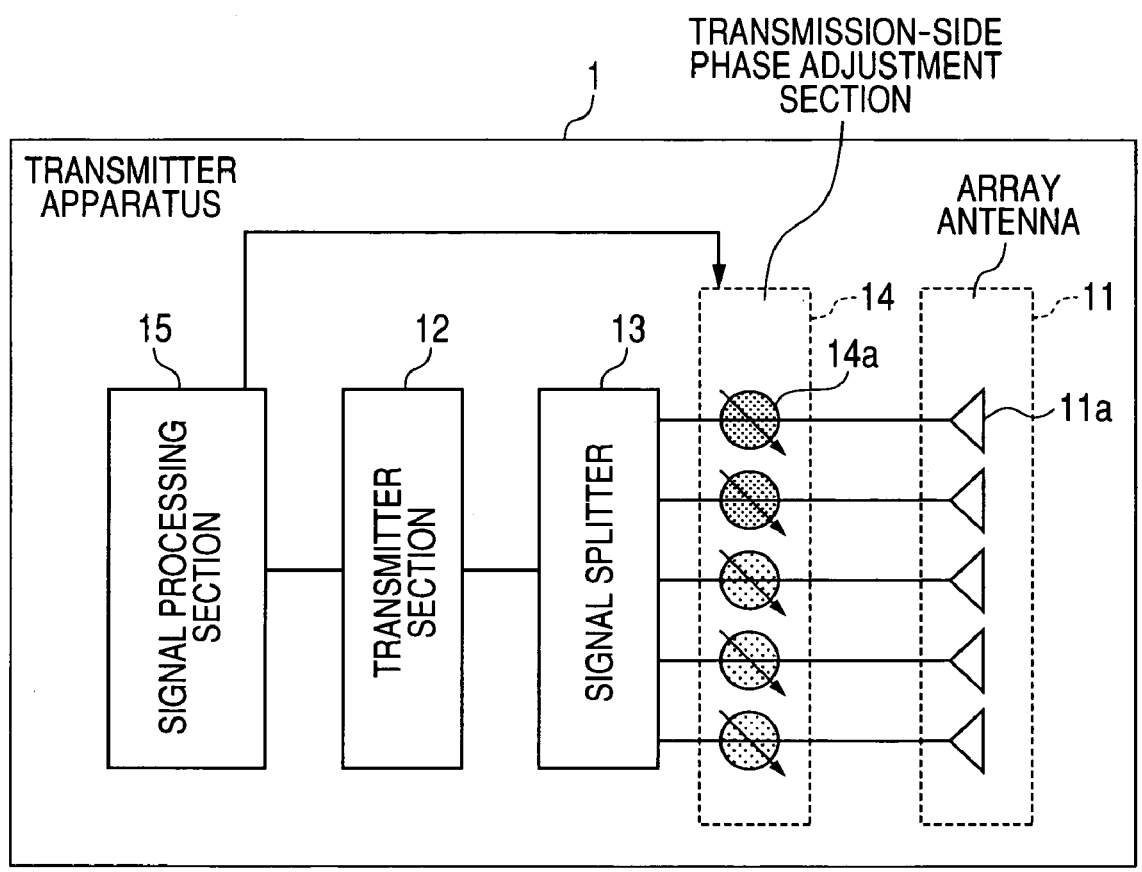
FIG. 1 is a block diagram showing the general configuration of a first embodiment, which is a RF pulse signal transmitter apparatus.

FIG. 1 is a block diagram showing the general configuration of a first embodiment, which is a transmitter apparatus designated by numeral 1. As shown in FIG. 1, the transmitter apparatus 1 includes an array antenna 11, a transmitter section 12, a signal splitter 13, a transmission-side phase adjustment section 14 and a signal processing section 15. The array antenna 11 has five antenna elements 11a. The transmitter section 12 generates a high-frequency signal (RF signal) as a transmission signal, which is divided between five paths by the signal splitter 13 as shown, to be supplied via the transmission-side phase adjustment section 14 to the respective antenna elements 11a. The transmission-side phase adjustment section 14 has five phase shifters 14a, which are controlled by command signals supplied from the signal processing section 15 for adjusting the respective phases of the individual transmission signals that are outputted from the signal splitter 13. In addition to controlling these phases, the signal processing section 15 generates command signals for controlling various sections of the transmitter apparatus 1.

It can thus be understood that the transmitter apparatus 1 can transmit a beam of electromagnetic waves having a directivity pattern that is controlled by adjusting the phases of the individual transmission signals that are respectively supplied to the antenna elements 11a. This adjustment is performed in accordance with transmission-side beam adjustment commands produced by the signal processing section 15, as described in the following.

The signal processing section 15 is a usual type of microcomputer, formed of a CPU, ROM, RAM, ND converter, etc., which controls transmission of high-frequency signals by executing processing which includes generating the transmission-side beam adjustment commands, etc.

The processing (referred to in the following as the beam transmission processing) which is executed by the signal processing section 15 for generating beams of electromagnetic waves from the array antenna 11 in a predetermined sequence, oriented in successively different directions, during successive pulse-on interval of a transmitted RF pulse signal, will be described referring to the flow diagram of FIG. 2 and the timing diagram of FIG. 3A. This processing is repetitively executed by the signal processing section 15 while the signal processing section 15 is in operation, i.e., while operating power is being supplied to the signal processing section 15.

Figure 3A:
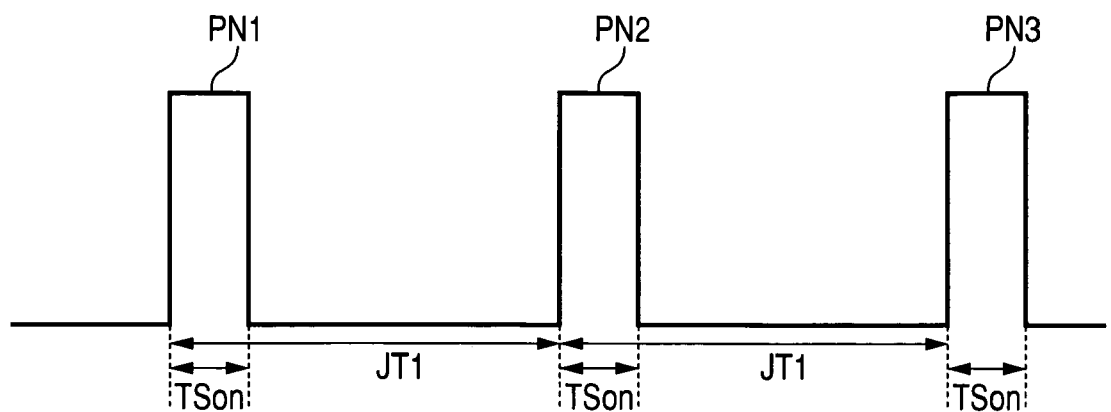
FIG. 3A is a timing diagram for describing a RF pulse signal that is generated by the first embodiment.

When an execution of the processing begins, firstly (step S10) the signal processing section 15 sets a transmission direction command value Kb to a transmission direction initial value θini, which with this embodiment is −10° (e.g., in azimuth). Next in step S20, phase difference adjustment commands are supplied to the transmission-side phase adjustment section 14. These are:

(1) a transmission-on phase adjustment command which designates a phase distribution of the individual transmission signals during a transmission-on interval TSon shown in FIG. 3A, i.e., corresponding to a pulse-on interval of a RF pulse signal generated by the transmitter section 12, whereby the array antenna 11 transmits a beam of electromagnetic waves in a direction θk that is specified by the transmission direction command value Kb, and (2) a transmission-off phase adjustment command which designates a phase distribution of the individual transmission signals that is to be established until the start of the succeeding transmission-on interval TSon (i.e., is established during a succeeding pulse-off interval of the RF pulse signal), with this phase distribution being different from that of the transmission-on interval TSon. The level of electromagnetic waves (resulting from the leakage signal component of the RF pulse signal) transmitted as noise from the array antenna 11, in the direction specified by the transmission direction command value Kb, is thereby reduced.

Here, "phase distribution" signifies a specific combination of phases of the respective individual transmission signals supplied to the antenna elements 11a of the array antenna 11. In particular, in the case of the embodiments described herein, "phase distribution" signifies a predetermined fixed amount of phase shift between the individual transmission signals of adjacent antenna elements.

The phase distribution expressed by the transmission-on phase adjustment command is such that the phase difference φk between the individual transmission signals of adjacent antenna elements 11a conforms to the following equation:

$$\phi k = (\pi \cdot d \cdot \sin \theta k)/\lambda \quad (1)$$

Here, "d" denotes the pitch of the array of antenna elements 11a, while λ denotes the wavelength of the transmitted electromagnetic waves. The phase distribution expressed by the transmission-off phase adjustment command is such that the phase difference φk between adjacent antenna elements 11a conforms to the following equation:

$$\phi k = 2\pi/N \quad (2)$$

Here, N denotes the number of elements constituting the antenna elements 11a.

Following S20, S30 is executed in which the signal processing section 15 transmits to the transmission-side phase adjustment section 14 a command referred to in the following as a pulse-on command. As a result, the transmission-side phase adjustment section 14 firstly during a transmission-on interval TSon (which with this embodiment is for example 10 nanoseconds) sets the individual transmission signals of the antenna elements 11a to the phase distribution that is specified by the transmission-on phase adjustment command. When the transmission-on interval TSon has elapsed, the transmission-side phase adjustment section 14 sets the individual transmission signals to the phase distribution specified by the transmission-off phase adjustment command.

Following step S30, in step S40, incrementing of a transmission continuation interval judgement timer value TM1 is initiated. This timer is implemented using the RAM of the signal processing section 15, and with this embodiment is incremented once in every 100 nanoseconds.

In step S50, the transmission continuation interval judgement timer value TM1 is incremented, and a judgement is made as to whether the timer has reached a pulse interval judgement value JT1 (which with this embodiment corresponds for example to 500 nanoseconds). If that value has not yet been reached then step S50 is repeated.

If it is found that the value JT1 has been reached (YES in step S50), then incrementing of the transmission continuation interval judgement timer value TM1 is halted and the timer value is reset to zero (step S60). Hence, incrementing of the transmission continuation interval judgement timer value TM1 always commences from an initial timer value of zero, at the first execution of step S50 following execution of step S40.

A judgement is then made (step S70) as to whether the transmission direction command value Kb exceeds a transmission direction upper limit value JKm (with this embodiment, +10°). If it is judged that the transmission direction upper limit value JKm is not exceeded (NO in step S70), then the transmission direction command value Kb is updated (with this embodiment, by adding 10° to the current value of Kb), and operation returns to step S20. The processing of steps S20 to S80 is then repeated.

If the limit value JKm has been reached (YES in step S70) then this execution of the beam transmission processing is ended.

With this embodiment, the transmitted beam direction is initially set as −10° (in step S10) when the processing of FIG. 2 is commenced, and is incremented by 10° each time step S80 is executed. It can be understood that in each execution of the processing of FIG. 2, three successive beam directions (−10°, 0°, 10°) are established, respectively corresponding to three successive pulse-on intervals PN1, PN2 and PN3 as illustrated in FIG. 3A, with the duration of each pulse-on interval being 10 nanoseconds with this embodiment. Also as shown in FIG. 3A, the successive pulse-on intervals PN1, PN2 and PN3 are separated by an interval that is equal to the pulse interval judgement value JT1.

Figure 3B:
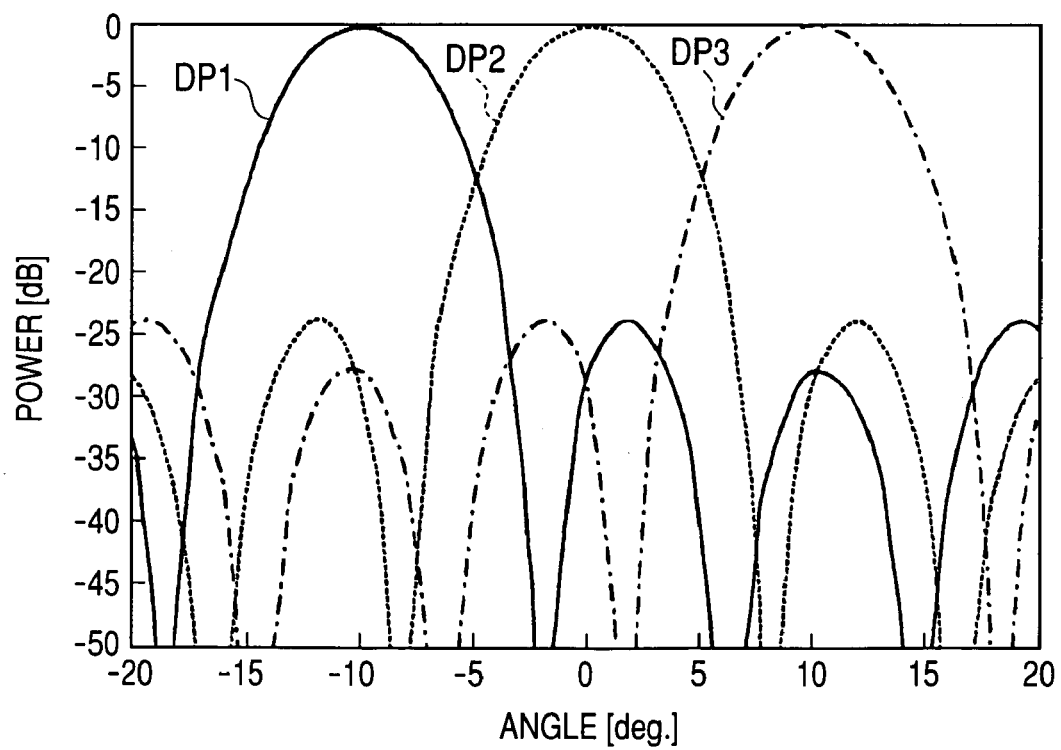
FIG. 3B shows respective directionality patterns of successively transmitted beams, generated by the first embodiment.

As a result of the respective phase distributions expressed by the transmission-on phase adjustment commands that are supplied in each execution of step S20 (i.e., three successive executions, corresponding to the pulse-on intervals PN1, PN2 and PN3), with the phases of the individual transmission signals of the antenna elements 11a being adjusted accordingly as described above, beam directivity patterns DP1, DP2, DP3 shown in FIG. 3B are successively established by the array antenna 11, which respectively correspond to the pulse-on intervals PN1, PN2 and PN3. That is, maximum transmitted power from the array antenna 11 occurs when the transmission direction θk becomes −10°, 0° and 10° respectively, during the pulse-on intervals PN1, PN2 and PN3 respectively.

Figure 4:
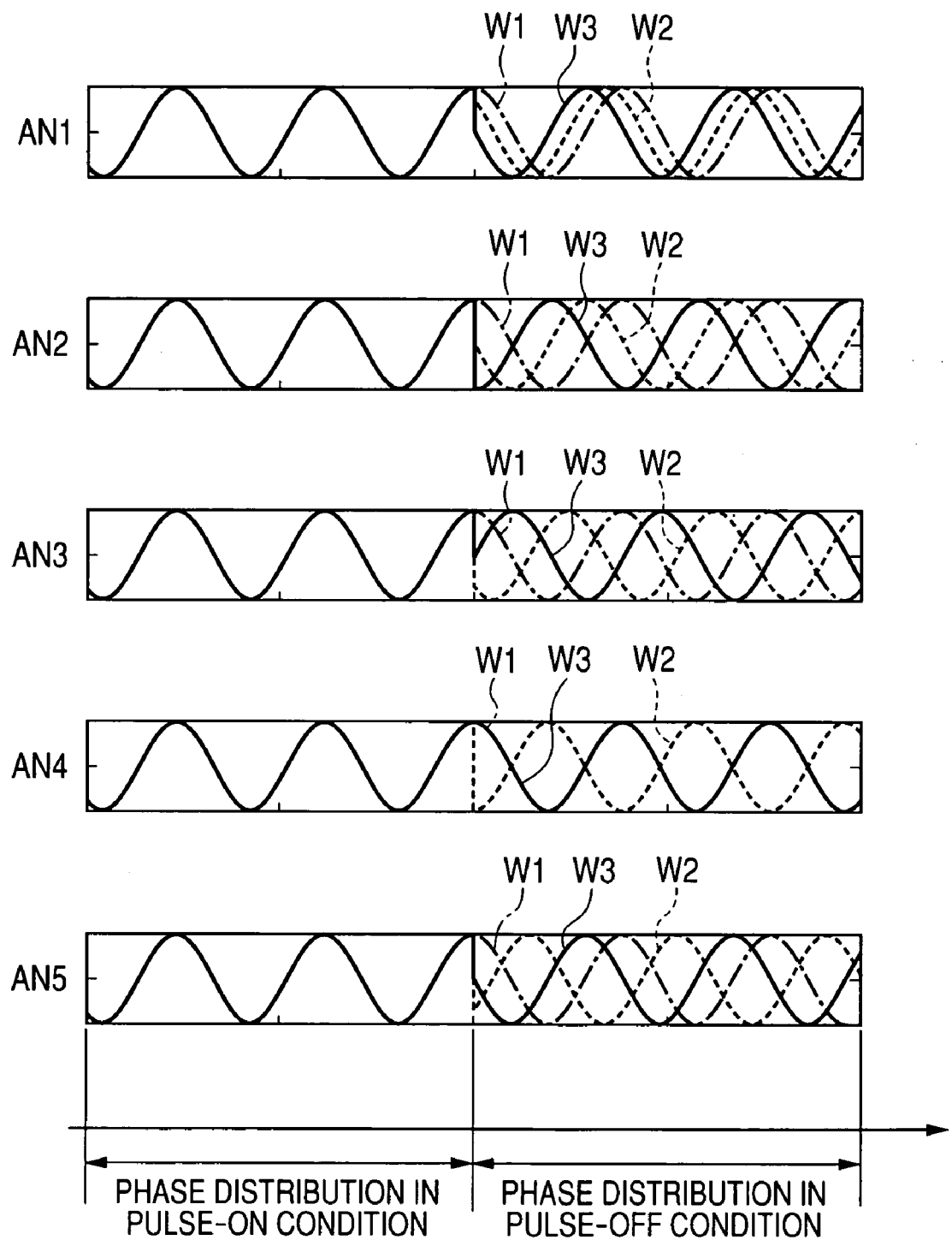
FIG. 4 shows waveform diagrams of the RF pulse signal immediately following a transition from a pulse-on interval to a pulse-off interval of the signal.

The principles of reducing the strength at which the leakage signal component of the RF pulse signal in the transmitted in a specific direction, during each of the pulse-off intervals (intervals JT1, JT2 in FIG. 3A), by phase adjustment of the individual transmission signals, will be described referring to FIGS. 4 and 5. FIG. 4 illustrates the phases of respective individual transmission signals immediately following a change from a pulse-on interval to a pulse-off interval, showing a transition of each signal from the phase condition which existed during the pulse-on interval to the phase condition that is established for pulse-off interval. The five antenna elements of the above embodiment are respectively designated as AN1 to AN5, and it is assumed that the individual transmission signals had an identical phase during the pulse-on interval, i.e., that a beam has been transmitted in the boresight (0°) direction of the array antenna 11 during that pulse-on interval. During the succeeding pulse-off interval, if the phase distribution of the individual transmission signals were to be left unchanged, then the combined individual transmission signals (transmitted RF pulse signal) would be as indicated as W11 in FIG. 5. In this case, the leakage signal component of the transmitted RF pulse signal will produce significant interference, i.e., having maximum strength in the same direction as during the preceding pulse-on interval.

If the phase difference between adjacent antenna elements is set as 45° as indicated by waveforms W2 in FIG. 4, then the combined individual If the phase difference between adjacent antenna elements is set as 45° as indicated by waveforms W2 in FIG. 4, then the combined individual transmission signals during the pulse-off interval will have an effective amplitude (i.e., with respect to transmission in the direction established in the pulse-on interval) which is ½ of the amplitude if the phase distribution were left unchanged. This is illustrated by waveform W12 in FIG. 5.

Figure 5:
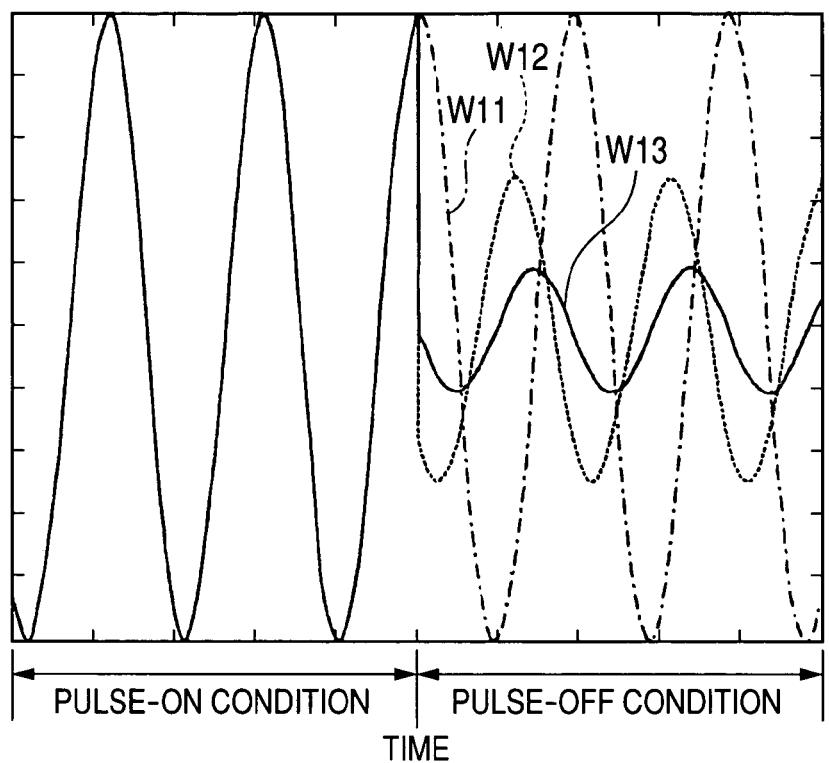
FIG. 5 is a waveform diagram for describing effects of altering a phase distribution of individual transmission signals which are respectively supplied to antenna elements of the first embodiment.

Similarly, if a 90° phase difference is established between antenna elements during the pulse-off interval, as indicated by the waveforms W3 in FIG. 4, then the effective amplitude of the combined individual transmission signals in the pulse-off interval will be reduced to ⅕, as illustrated by the waveform W13 in FIG. 5.

It can thus be understood that the phase distribution which is specified by the transmission-off phase adjustment command in step S20 of FIG. 2 serves to ensure that, after a beam has been transmitted by the array antenna 11 in the direction specified by the command value Kb during a pulse-on interval, the phase distribution of the individual transmission signals (leakage signals) during the succeeding pulse-off interval is appropriately altered, to establish a directivity pattern for the array antenna 11 which is substantially different from the directivity pattern during the pulse-on interval.

Thus, the effects of transmitted noise resulting from the leakage signal component of the RF pulse signal can be effectively reduced, i.e., the ratio of the signal power transmitted in the direction θk during a pulse-on interval to (noise) signal power that is transmitted in the direction θk during a pulse-off interval is effectively increased.

Figure 6:
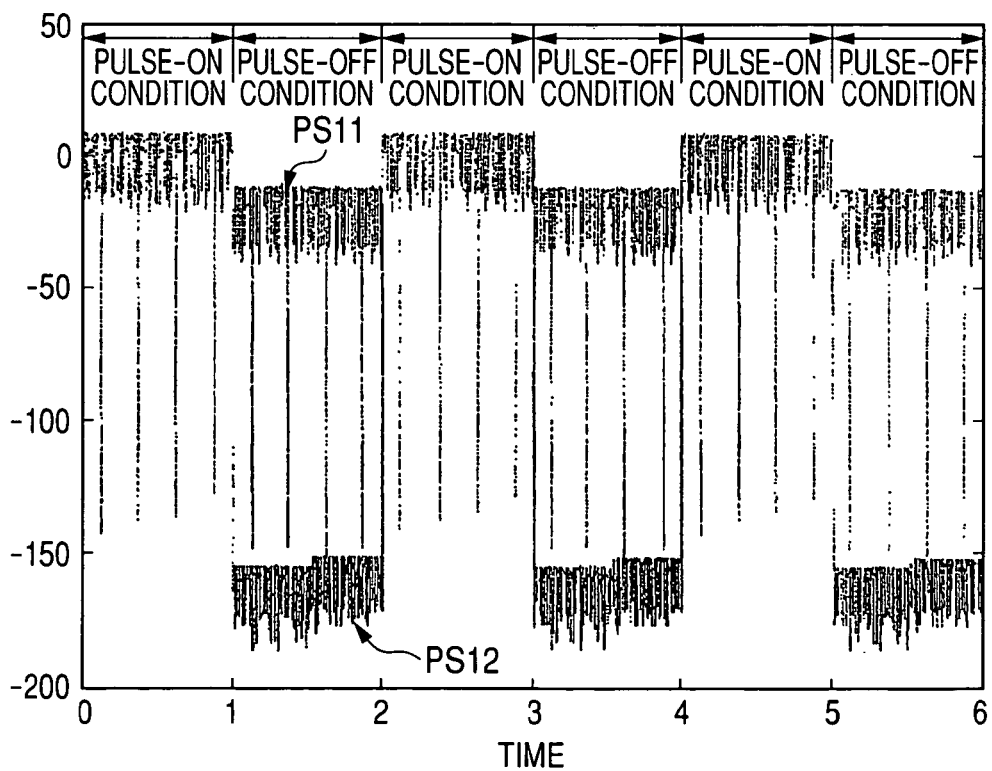
FIG. 6 is a diagram for illustrating a transmitted RF pulse signal, for the case in which the phases of individual RF pulse signals of respective antenna elements are left unchanged and for the case in which the respective phases are altered to reduce a leakage signal (noise) component.

FIG. 6 illustrates results obtained for the above-described method. In FIG. 6, PS11 indicates the relative amplitude of the combined signals (e.g., detected as intensity of transmitted electromagnetic waves) during each pulse-off interval, if the phase distribution of the individual transmission signals during the pulse-off intervals is left unchanged from that of the pulse-on intervals. PS12 indicates the corresponding amplitude for the case in which the phase distribution of the individual transmission signals is appropriately adjusted during each pulse-off interval as described above. As shown, a substantial reduction in the noise level resulting from the leakage signal component during each pulse-off interval can be achieved.

It is a basic advantage of the above embodiment that the desired objective is effectively achieved without requiring the use of additional devices such as switches or amplifiers. Thus, the existing system hardware of a RF pulse signal transmitter apparatus can be utilized, while achieving the desired results.

In addition to the above-described leakage signal component (a signal component having a phase), a RF pulse signal also contains a random noise component Nr during each pulse-off interval. If the leakage signal component is greater than the noise Nr, then improved transmission performance of the transmitter apparatus 1 can be achieved by lowering Nc as described above. That is to say, no further improvement can be achieved by making Nc less than Nr.

With respect to the appended claims, the transmitter section 12, the signal splitter 13 and the processing of step S30 of the flow diagram of FIG. 2, in combination, correspond to pulse signal supply circuitry. The transmission-side phase adjustment section 14 corresponds to transmission-side phase adjustment circuitry. The processing of step S20 corresponds to transmission direction control circuitry, and also to transmission-side phase alteration circuitry.

Second Embodiment

Figure 7:
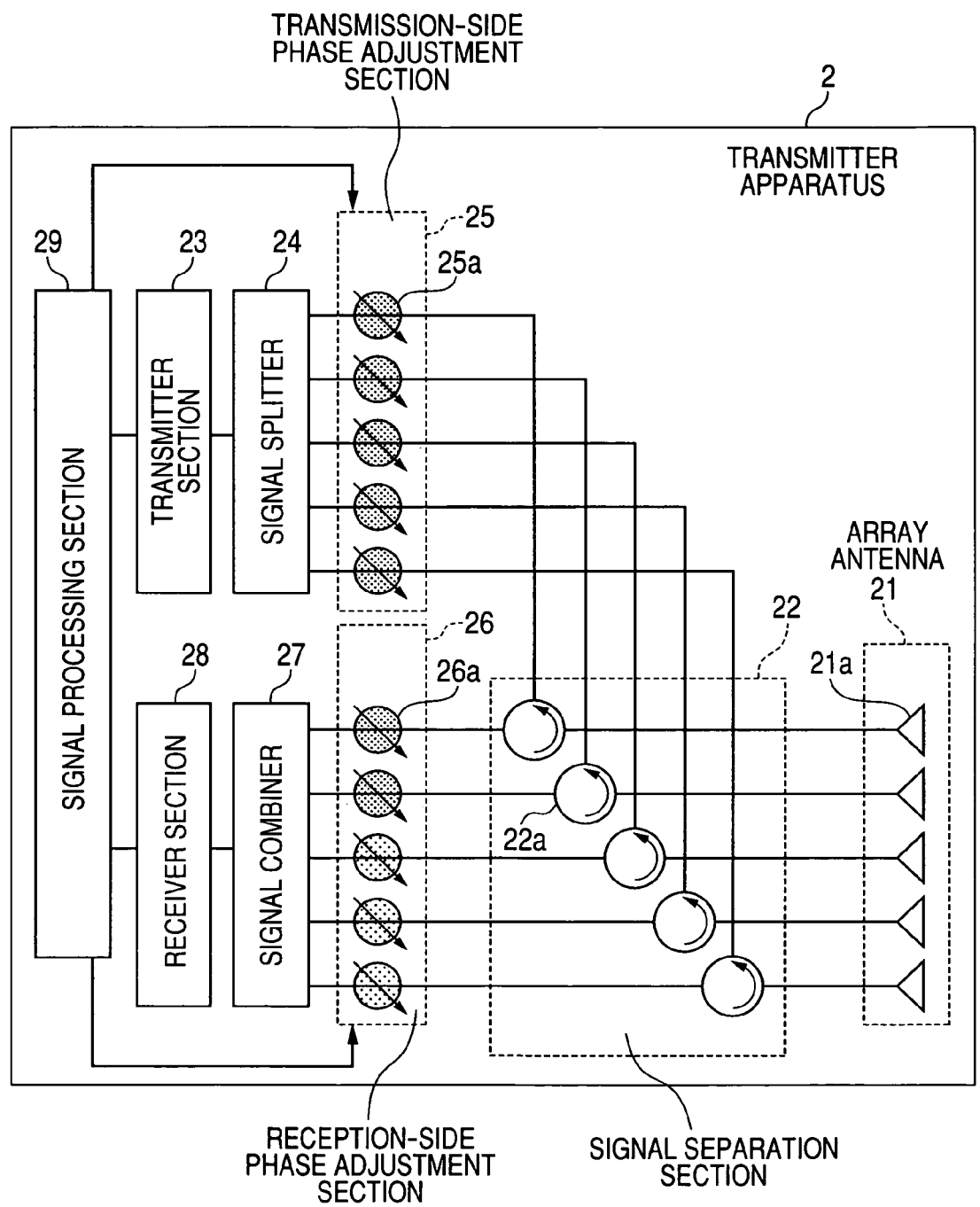
FIG. 7 is a block diagram showing the general configuration of a second embodiment, which is a RF pulse signal transmitter/receiver apparatus incorporating the transmitter apparatus of the first embodiment.

FIG. 7 is a block diagram showing the general configuration of a second embodiment, which is a RF pulse signal transmitter/receiver apparatus 2. As shown, the transmitter/receiver apparatus 2 includes an array antenna 21 having an array of antenna elements 21a, a signal separator section 22, a transmitter section 23, a signal splitter 24, a transmission-side phase adjustment section 25, a reception-side phase adjustment section 26, a signal combiner 27, a receiver section 28 and a signal processing section 29. The signal separator section 22 distributes (phase-adjusted) individual transmission signals to respective ones of the antenna elements 21a, and receives individual received signals from respective ones of the antenna elements 21a. The transmitter section 23 is controlled by the signal processing section 29 to generate a RF pulse signal as described for the transmitter section 12 of the preceding embodiment, which is supplied to the signal splitter 24. The functions of the signal splitter 24 and of the transmission-side phase adjustment section 25 are respectively identical to the functions of the signal splitter 13 and transmission-side phase adjustment section 14 of the first embodiment described above (i.e., with the function of phase shifters 25a of the transmission-side phase adjustment section 25 corresponding to those of the phase shifters 14a of the transmission-side phase adjustment section 14) so that detailed description is omitted. Phase-adjusted individual transmission signals produced from the transmission-side phase adjustment section 25 are transferred via the signal separator section 22 to respective ones of the antenna elements 21a.

The reception-side phase adjustment section 26 is formed of a plurality of phase shifters 26a which respectively perform phase adjustment of the individual received signal that are supplied from the signal separator section 22. The signal combiner 27 combines the resultant phase-adjusted individual received signals from the reception-side phase adjustment section 26, and supplied the resultant combined received signal to the receiver section 28. The receiver section 28 performs frequency conversion, filtering and amplification of the combined received signal, and supplies the results to the signal processing section 29. The signal processing section 29 produces various types of commands for controlling respective sections of the transmitter/receiver apparatus 2, and also performs various forms of processing based upon the output received from the receiver section 28.

With this embodiment, the directionality pattern of a transmitted beam produced from the array antenna 21 and the directionality pattern of a reception beam of the array antenna 21 are controlled independently of one another, by independently controlling the phases of the individual transmission signals and the phases of the individual received signals.

Figure 8A:
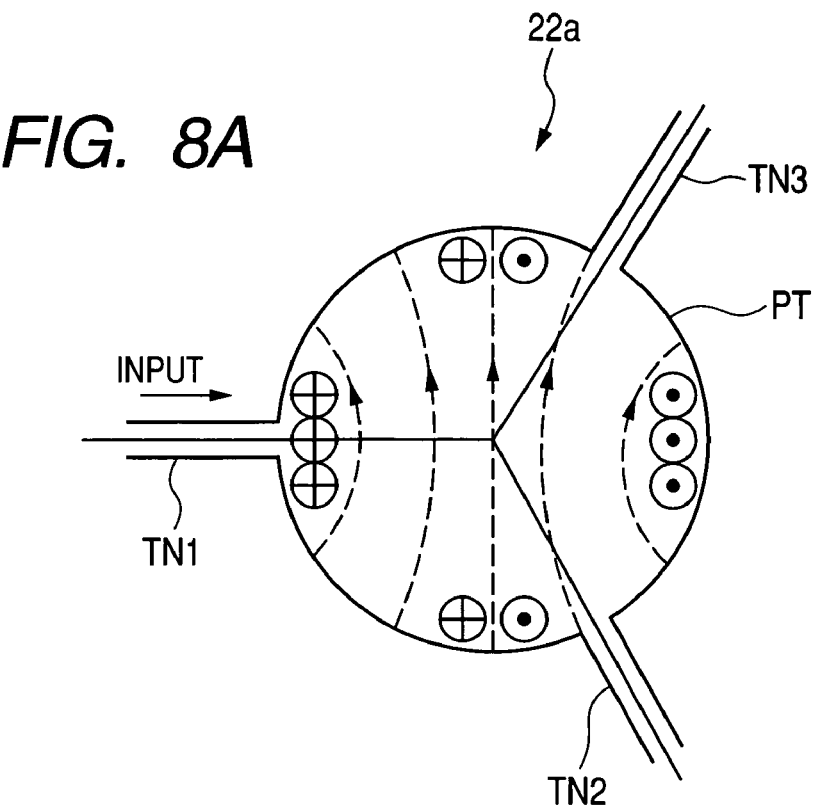
FIGS. 8A and 8B are diagrams for describing the operating principles of circulators which are utilized in the second embodiment.
Figure 8B:
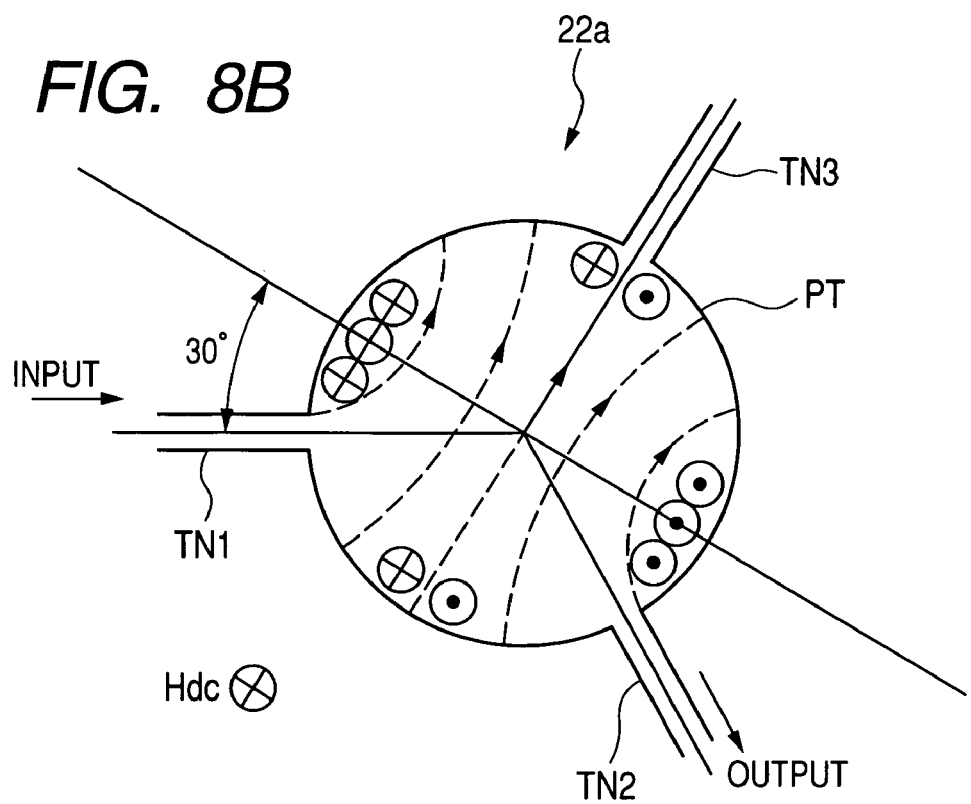

The individual transmission signals and individual received signals have frequencies in the microwave range, and the signal separator section 22 is formed of five microwave circulators 22a, connected as shown in FIG. 7. The internal configuration and operation of a circulator of this embodiment are illustrated in FIGS. 8A and 8B. The circulator is formed using microstrip lines. An annular strip PT formed of thin metallic film is connected to three I/O (input/output) terminals TN1, TN2, TN3, and is disposed on a ferrite substrate. A cylindrical permanent magnet (formed of permalloy, not shown in the drawings) is disposed above the thin film PT for applying a unidirectional magnetic field to the ferrite substrate.

If the magnet field is not applied, then as shown in FIG. 8A, when electromagnetic waves (i.e., microwaves) are inputted via the I/O terminal TN1, respectively identical outputs will be produced from the I/O terminals TN2 and TN3. However if a magnet field Hdc is applied as illustrated in FIG. 8B, then the spin of the electrons in the ferrite interacts with the magnet field Hdc, causing a shift in the electromagnetic propagation mode. By applying a suitable strength of magnet field Hdc (as with the circulators 22a of this embodiment) the mode becomes rotated by 30°. Thus for example, electromagnetic waves which are inputted via the I/O terminal TN1 are transferred to be outputted from the I/O terminal TN2, with no output being produced from the I/O terminal TN3.

The signal processing section 29 is a usual type of microcomputer, formed of a CPU, ROM, RAM, ND converter, etc., which performs processing to control the generation of a RF pulse signal by the transmitter section 23, and control the directions in which high-frequency waves are transmitted from the array antenna 21 during each pulse-on interval of the RF pulse signal, as described for the first embodiment above. The signal processing section 29 further executes processing for controlling a reception beam directionality pattern of the array antenna 21 during each pulse-off interval, as described hereinafter.

Since the transmission operations of this embodiment (performed by the signal splitter 24 and transmission-side phase adjustment section 25 under the control of the signal process-ing section 29) are similar to those described for the first embodiment, detailed description is omitted.

With this embodiment, during each pulse-off interval, the receiver section 28 is supplied with a received signal from the signal combiner 27, which has been produced by combining the respective individual received signals of the antenna elements 21a after these have been phase-adjusted by the reception-side phase adjustment section 26. During each pulse-off interval, there is a danger that the above-described leakage signal components of the transmitted RF pulse signal will enter the reception side of the signal separator section 22, i.e., by interfering with the operation of the circulators 22a and thereby interfering with the received signals that are supplied from the antenna elements 21a. The reception performance of the transmitter/receiver apparatus 2 could thereby be lowered.

In particular, the effect of such interference is especially large if the individual received signals from the antenna elements 21a have identical phase to the individual transmission signals of the corresponding ones of the antenna elements 21a.

However with this embodiment, since the transmission operation is controlled in an identical manner to that described for the first embodiment referring to the flow diagram of FIG. 2, i.e., with a transmission-off phase adjustment command being issued prior to each pulse-on interval for specifying an appropriate phase distribution for the individual transmission signals during the succeeding pulse-off interval (a different phase distribution from that of the pulse-on interval), it is ensured that interference resulting from the leakage signal components of the transmitted RF pulse signals is effectively reduced. In particular, interference occurring within the circulators 22a during each pulse-off interval is reduced. Hence, the reception performance of the transmitter/receiver apparatus 2 is enhanced.

With the second embodiment described above, the transmitter section 23, the signal splitter 24, and the processing of steps S30 and S60, in combination, correspond to pulse signal supply circuitry as recited in the appended claims, while the transmission-side phase adjustment section 25 corresponds to transmission-side phase adjustment circuitry, and the circulators 22a and receiver section 28, in combination, correspond to receiver circuitry.

Third Embodiment

Figure 9:
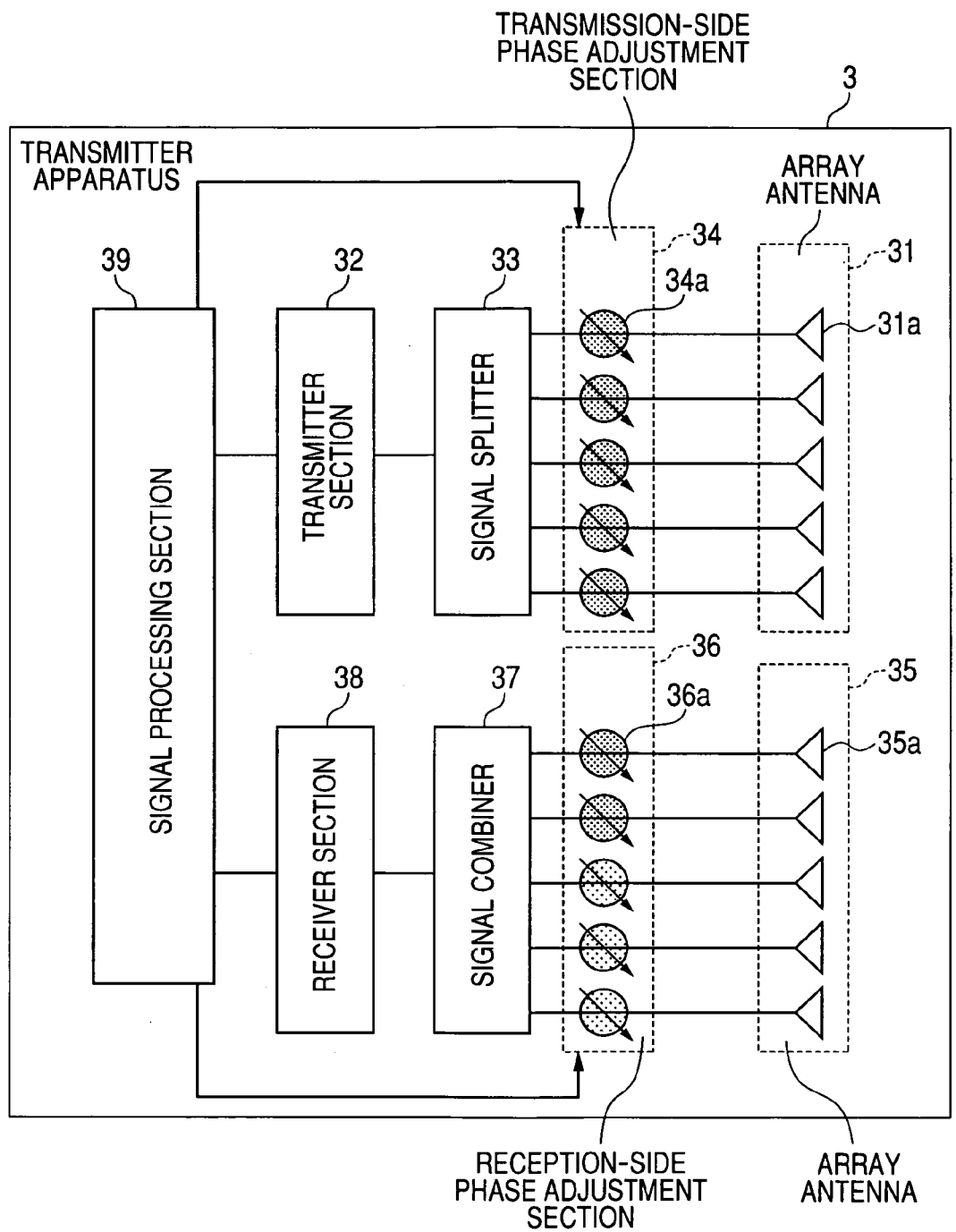
FIG. 9 is a block diagram showing the general configuration of a third embodiment, which is a RF pulse signal transmitter/receiver apparatus incorporating the transmitter apparatus of the first embodiment.

A third embodiment will be described, which is a radar transmitter/receiver apparatus 3 having the general configuration shown in the block diagram of FIG. 9. The transmitter/receiver apparatus 3 basically differs from the preceding embodiment in that a receiving antenna and a transmitting antenna are provided respectively separately, with signal paths of the transmission signals being separate from those of received signals.

As shown, the transmitter/receiver apparatus 3 includes a array antenna 31 having an array of antenna elements 31a, a transmitter section 32, a signal splitter 33, a transmission-side phase adjustment section 34, a array antenna 35, a reception-side phase adjustment section 36, a signal combiner 37, a receiver section 38 and a signal processing section 39. The transmitter section 32 generates a RF pulse signal under the control of the signal processing section 39, as described for the transmitter section 12 of the first embodiment, with the RF pulse signal being supplied to the signal splitter 33. The functions of the transmitter section 32, the signal splitter 33, the transmission-side phase adjustment section 34 and the array antenna 31 are respectively identical to the functions of the transmitter section 12, the signal splitter 13, the transmission-side phase adjustment section 14 and the array antenna 11 of the first embodiment described above, and are controlled by the signal processing section 39 as described for the control executed by the signal processing section 15 of the first embodiment, so that detailed description of these is omitted.

In addition, the functions of the receiver section 38, the signal combiner 37, the reception-side phase adjustment section 36 and the array antenna 35 respectively correspond to those of the receiver section 28, the signal combiner 27, and the reception-side phase adjustment section 26 of the second embodiment described above, but with these being controlled by the signal processing section 39 in a manner that is specific to this embodiment as described in the following, and with individual received signals produced from the antenna elements 35a of the array antenna 35 being supplied directly to respectively corresponding ones of the reception-side phase shifters 36a.

The signal processing section 39 is a usual type of microcomputer, formed of a CPU, ROM, RAM, A/D converter, etc., which performs processing to control various sections of the transmitter/receiver apparatus 3 as described in the following.

Figure 10:
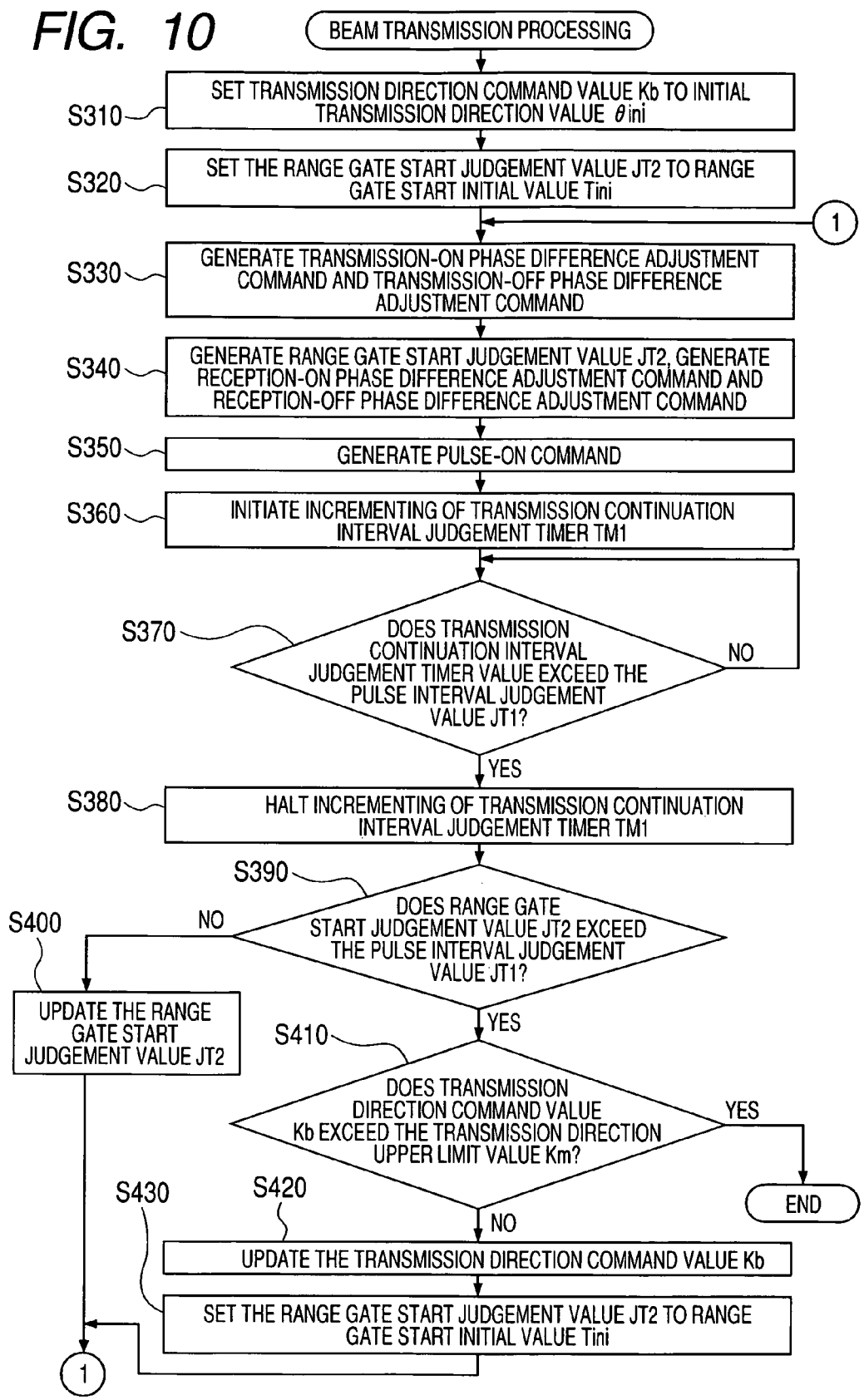
FIG. 10 is a flow diagram of processing executed by the third embodiment.
Figure 11:
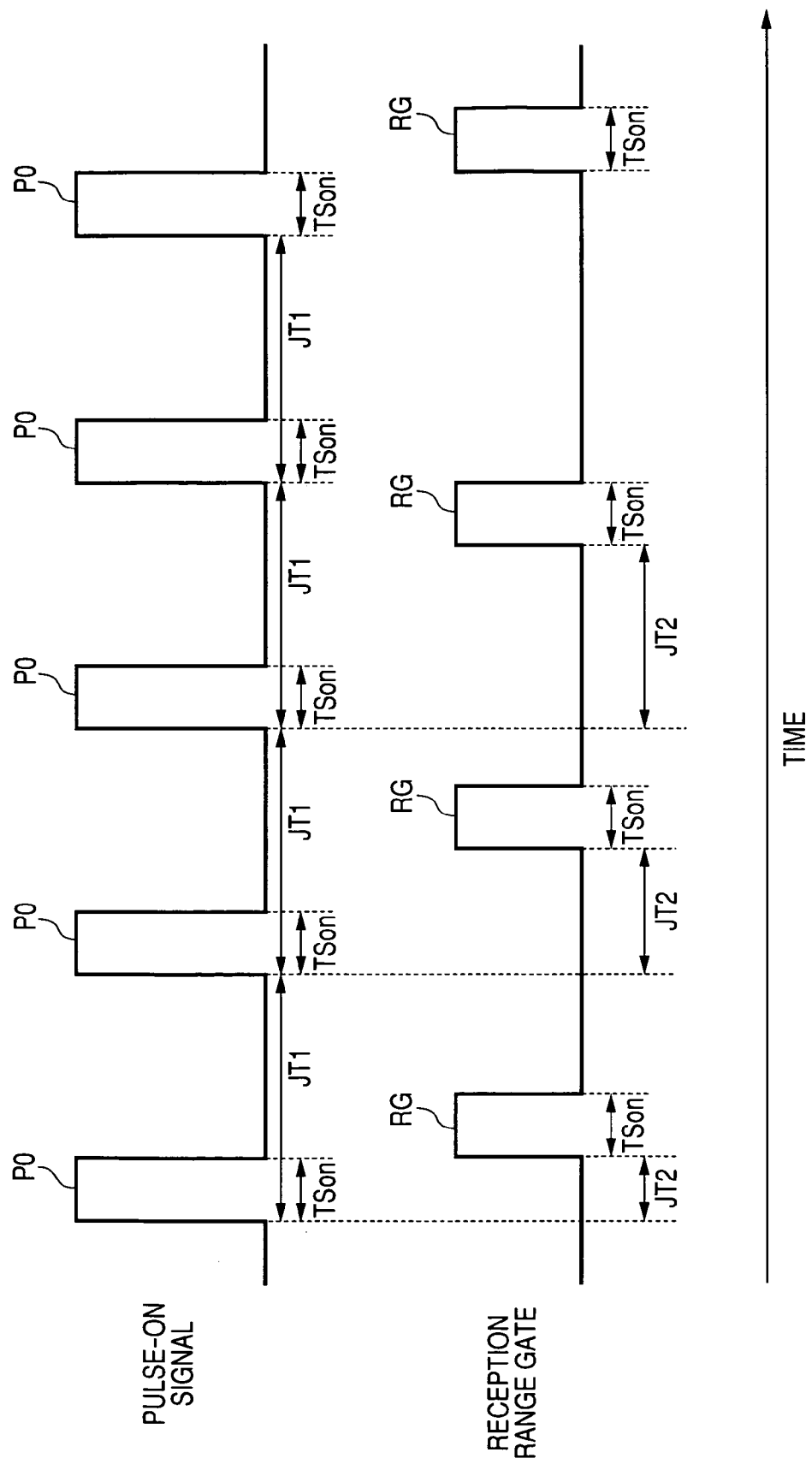
FIG. 11 shows timing diagrams for use in describing the operation of the third embodiment.
Figure 12:
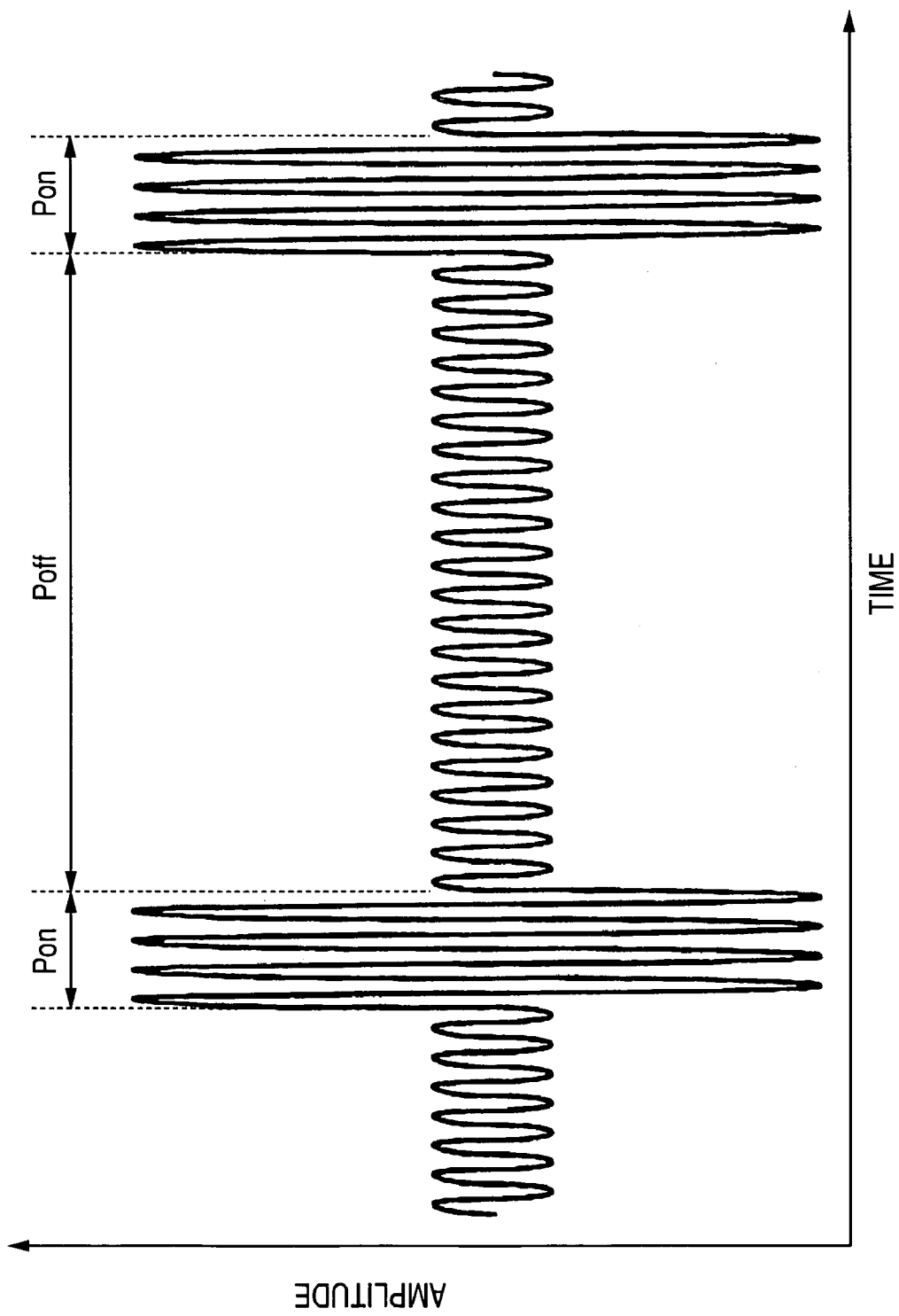
FIG. 12 is a waveform diagram illustrating a RF pulse signal.

The processing executed by the signal processing section 39 for controlling transmission and reception operations will be described referring to the flow diagram of FIG. 10 and the timing diagram of FIG. 11. This processing is repetitively executed by the signal processing section 39 while it is in operation.

Firstly (step S310) the signal processing section 39 sets a transmission direction command value Kb to an initial value θini, which with this embodiment is −10°.

Next in step S320, a range gate start timing value JT2 is set as an initial range gate start timing value Tini. This is a timing at which a reception range gate RG begins, as shown in FIG. 11.

In step S330, a transmission-on phase adjustment command and a transmission-off phase adjustment command are supplied to the transmission-side phase adjustment section 34. As described for the first embodiment hereinabove, the transmission-on phase difference adjustment command specifies (for the individual transmission signals supplied to the antenna elements 31a) a predetermined phase distributions whereby the array antenna 31 generates a beam having maximum strength in the direction specified by the transmission direction command value Kb, during the next pulse-on interval (having duration TSon, which with this embodiment is for example 10 nanoseconds) of the RF pulse signal that is generated by the transmitter section 32, while the transmission-off phase difference adjustment command specifies a predetermined phase distribution whereby the strength of the beam (along the direction specified by the transmission direction command value Kb) from the antenna elements 31a is minimized during the succeeding pulse-off interval.

Next in step S340, the range gate start timing value JT2, a reception-on phase difference adjustment command, and a reception-off phase difference adjustment command are supplied to the reception-side phase adjustment section 36. The reception-on phase difference adjustment command specifies a predetermined phase distribution of the individual received signals from the array antenna 35 whereby maximum reception sensitivity occurs for the direction specified by the transmission direction command value Kb (i.e., maximum reception sensitivity for received waves which arrive along that direction). The reception-off phase difference adjustment command specifies a predetermined phase distribution of the individual received signals whereby minimum (i.e., null) reception sensitivity occurs with respect to the direction specified by the transmission direction command value Kb.

As a result, (as illustrated in the timing diagram of FIG. 11) when a pulse-on interval is initiated in steps S350, then after an interval corresponding to the range gate start timing value JT2 has elapsed, the reception-side phase adjustment section 36 adjusts the phase distribution of the respective individual received signals to become as specified by the reception-on phase difference adjustment command, with the phase-adjusted individual received signals then being combined into a single received signal by the signal combiner 37, which is supplied to the receiver section 38.

This condition is continued during the interval of a range gate RG (which with this embodiment has the duration TSon), then the reception-side phase adjustment section 36 adjusts the phase distribution of the respective individual received signals to become as specified by the reception-off phase difference adjustment command.

The above operations are repeated from the start of the next pulse-on interval, with an updated value of the range gate start timing value JT2 being applied as described in the following.

Following step S340, step S350 is executed in which the signal processing section 39 transmits to the transmitter section 32 and transmission-side phase adjustment section 34 a pulse-on command. As a result, the transmission-side phase adjustment section 34 firstly during the aforementioned transmission-on interval (of duration TSon, which with this embodiment is for example 10 nanoseconds) sets the individual transmission signals of the antenna elements 31a to the phase distribution specified by the transmission-on phase adjustment command. When the transmission-on interval has elapsed, the transmission-side phase adjustment section 34 sets the individual transmission signals to the phase distribution specified by the transmission-off phase adjustment command.

Following step S350, in step S360, incrementing of a transmission continuation interval judgement timer TM1 is initiated. This timer is implemented using the RAM of the signal processing section 39, and with this embodiment is incremented once every 100 nanoseconds for example.

Next in step S370, a judgement is made as to whether the transmission continuation interval judgement timer value TM1 has reached a pulse interval judgement value JT1 (expressing the duration of one period of the RF pulse signal generated by the transmitter section 32, for example with this embodiment expressing 500 nanoseconds). If that value has not yet been reached then the timer is incremented and step S370 is repeated.

If it is found that the value JT1 has been reached (YES in step S37), then incrementing of the transmission continuation interval judgement timer value TM1 is halted and the timer value is reset to zero (step S380).

Next in step S390, a decision is made as to whether the range gate start timing value JT2 exceeds the pulse interval judgement value JT1. If not (i.e., NO decision in step S390) then step S400 is executed, in which the range gate start timing value JT2 is updated by being incremented by a predetermined gate start updating value. Operation then returns to step S330, and the above processing is repeated starting from step S330. With this embodiment, the gate start updating value is identical to the transmission-on interval value TSon.

However if it is found in step S390 that the range gate start timing value JT2 exceeds the pulse interval judgement value JT1, then step S410 is executed. In step S410, a judgement is made as to whether the transmission direction command value Kb exceeds a transmission direction upper limit value JKm (with this embodiment, +10° for example). If the transmission direction upper limit value JKm is not exceeded (NO in step S410), then the transmission direction command value Kb is updated by being incremented (e.g., by)10° in step S420.

Step S430 is then executed, in which the range gate start timing value JT2 is set as the initial range gate start timing value Tini. Operation then returns to step S330, and the above processing is repeated starting from step S330.

If the upper limit value JKm of the transmission direction has been reached (YES in step S410) then this execution of the processing is ended.

With this embodiment as can be understood from the above, during a pulse-on interval of the RF pulse signal generated by the transmitter section 32 (having duration TSon), a beam of electromagnetic waves is transmitted in a direction specified by the transmission direction command value Kb. This control is based on the transmission-on phase adjustment command of step S340. After a range gate start interval JT2 has elapsed following the commencement of the pulse-on interval, during the interval of a reception range gate (also having duration TSon), the reception-side phase adjustment section 36 is controlled to provide maximum reception sensitivity for received waves which arrive from the direction specified by the transmission direction command value Kb (i.e., maximum amplitude of the combined received signal that is derived by the signal combiner 37). This control is based on the reception-on phase adjustment command of step S340.

Other than during a range gate interval, the reception-side phase adjustment section 36 is controlled to establish a phase distribution of the individual received signals from the antenna elements 35a which is different from the phase distribution of the individual transmission signals during the preceding pulse-on interval. The reception sensitivity for received waves which arrive from the direction specified by the transmission direction command value Kb is thereby lowered. This control is based on the transmission-off phase adjustment command of step S340.

The operation is repeated for a fixed plurality of successive RF pulse signal periods as determined by step S390, with the beam direction θk being left unchanged during the cycle and with the start timing JT2 of the range gate being scanned within each inter-pulse interval between successive pulse-on intervals (i.e., within each pulse-off interval) by the updating operation of step S400. That sequence of operations is repeated each time the transmission direction θk has become updated (S310 or step S420), with the start timing JT2 of the range gate being reset to an initial timing Tini (step S320 or S430).

In that way, in addition to the advantages provided for the transmitter section as described hereinabove for the first embodiment, improved reception performance (improved resistance to received noise) is achieved by lowering the reception sensitivity of the transmitter/receiver apparatus at times other than during each range gate interval, through appropriate adjustment of the phase distribution of the individual received signals from the array antenna 35. It will be understood that this embodiment is applicable as a radar apparatus which receives reflected electromagnetic waves that, in general, return along substantially the same direction as transmitted waves.

It should be noted that although the third embodiment has been described for the case in which the transmitter/receiver apparatus incorporates a transmitter apparatus in accordance with the first embodiment, it would be equally possible to utilize the receiver section of the third embodiment in conjunction with a prior art type of RF pulse signal transmitter apparatus which does not alter the phase distribution of the individual transmission signals in the pulse-off intervals.

It should thus be understood that the invention is not limited to the embodiments described above, and that various modifications or alternative configurations of the embodiments may be envisaged, which fall within the claimed scope of the invention.

What is claimed is:

1. A transmitter apparatus comprising
   a first array antenna, comprising a first plurality of antenna elements arrayed with a fixed pitch,
   RF pulse signal supplying circuitry configured to supply a RF pulse signal as a plurality of individual transmission signals to respective ones of said first plurality of antenna elements, said RF pulse signal alternating between a pulse-on condition of large amplitude and a pulse-off condition of small amplitude,
   transmission-side phase adjustment circuitry controlled for adjusting a phase distribution of said individual transmission signals, and
   transmission direction control circuitry configured to control said transmission-side phase adjustment circuitry during said pulse-on condition for establishing a first phase distribution of said individual transmission signals and thereby transmitting said RF pulse signal as electromagnetic waves from said antenna in a predetermined direction;
   wherein said transmitter apparatus comprises transmission-side phase alteration circuitry configured to control said transmission-side phase adjustment circuitry during said pulse-off condition for establishing a second phase distribution of said individual transmission signals, said second phase distribution being different from said first phase distribution.

2. A transmitter/receiver apparatus comprising a transmitter apparatus as claimed in claim 1, wherein said first array antenna functions in common as a transmitting antenna and as a receiving antenna, with a plurality of individual received signals being produced from respective ones of said first plurality of antenna elements during said pulse-off condition of said RF pulse signal, and wherein said transmitter/receiver apparatus comprises
   a plurality of circulators coupled to supply said individual transmission signals to said first plurality of antenna elements and to receive said individual received signals from said first plurality of antenna elements, while isolating said individual received signals from said individual transmission signals, and
   receiver circuitry coupled to receive said received signals from said circulators.

3. A transmitter/receiver apparatus comprising
   a transmitter apparatus as claimed in claim 1,
   a second array antenna, comprising a second plurality of antenna elements arrayed with a fixed pitch,
   receiver circuitry coupled to receive a plurality of individual received signals supplied from respective ones of said second plurality of antenna elements,
   reception-side phase adjustment circuitry controlled for adjusting a phase distribution of said individual received signals,
   reception direction control circuitry configured for selecting a gate interval, commencing after a predetermined adjustment start interval has elapsed following an occurrence of said pulse-on condition of said individual transmission signals, within an inter-pulse interval between a termination of said pulse-on condition and a succeeding occurrence of said pulse-on condition, and for controlling said reception-side phase adjustment circuitry to establish a first phase distribution of said individual reception signals during said gate interval for maximizing a reception sensitivity with respect to received signals corresponding to said predetermined direction, said gate interval having a duration substantially identical to a duration of said pulse-on condition, and gate interval scanning circuitry configured to scan said gate interval within said inter-pulse interval;

comprising reception-side phase alteration circuitry configured to control said reception-side phase adjustment circuitry for establishing a second phase distribution of said individual reception signals, different from said first phase distribution, other than when said reception direction control circuitry is applying control to establish said first phase distribution.

4. A transmitter/receiver apparatus as claimed in claim 3, wherein said second phase distribution of said individual reception signals is predetermined for minimizing said reception sensitivity with respect to received signals corresponding to said predetermined direction.

5. A receiver apparatus for use in conjunction with a transmitter apparatus, for receiving a RF pulse signal which is transmitted by said transmitter apparatus as electromagnetic waves in a predetermined direction, said received RF pulse signal alternating between a pulse-on condition of large amplitude and a pulse-off condition of small amplitude, said receiver apparatus comprising an array antenna, comprising a plurality of antenna elements arrayed with a fixed pitch, receiver circuitry configured to acquire said received RF pulse signal as a plurality of individual received signals supplied from respective ones of said plurality of antenna elements, phase adjustment circuitry controlled for adjusting a phase distribution of said individual received signals, reception direction control circuitry configured for selecting a gate interval, commencing after a predetermined adjustment start interval has elapsed following an occurrence of said pulse-on condition of said received RF pulse signal, within an inter-pulse interval which elapses between a termination of said pulse-on condition and commencement of a succeeding occurrence of said pulse-on condition, and for controlling said reception-side phase adjustment circuitry to establish a first phase distribution of said individual reception signals during said gate interval for maximizing a reception sensitivity with respect to received signals corresponding to said predetermined direction, said gate interval having a duration substantially identical to a duration of said pulse-on condition, and gate interval scanning circuitry configured to scan said gate interval within said inter-pulse interval;

wherein said transmitter/receiver apparatus comprises phase alteration circuitry configured to control said phase adjustment circuitry for establishing a second phase distribution of said individual reception signals, different from said first phase distribution, other than when said reception direction control circuitry is applying control to establish said first phase distribution.

6. A receiver apparatus as claimed in claim 5, wherein said second phase distribution of said individual reception signals is predetermined for minimizing said reception sensitivity with respect to received signals corresponding to said predetermined direction.

* * * * *